US009135621B2

(12) United States Patent
Fisher et al.

(10) Patent No.: US 9,135,621 B2
(45) Date of Patent: *Sep. 15, 2015

(54) METHODS AND SYSTEMS FOR PERFORMING AUTHENTICATION IN CONSUMER TRANSACTIONS

(71) Applicant: Visa International Service Association, San Francisco, CA (US)

(72) Inventors: Douglas Fisher, Mountain View, CA (US); Benedicto H. Dominguez, San Bruno, CA (US); Timothy Mu-chu Lee, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/887,082

(22) Filed: May 3, 2013

(65) Prior Publication Data

US 2013/0317989 A1 Nov. 28, 2013

Related U.S. Application Data

(63) Continuation of application No. 11/681,704, filed on Mar. 2, 2007, now Pat. No. 8,453,925.

(60) Provisional application No. 60/778,282, filed on Mar. 2, 2006.

(51) Int. Cl.
*G06K 7/00* (2006.01)
*G06Q 20/38* (2012.01)
(Continued)

(52) U.S. Cl.
CPC ............ *G06Q 20/382* (2013.01); *G06Q 20/24* (2013.01); *G06Q 20/341* (2013.01); *G06Q 20/40* (2013.01); *G06Q 20/4014* (2013.01); *G06Q 30/06* (2013.01); *G07F 7/1008* (2013.01)

(58) Field of Classification Search
USPC .................................. 235/375, 380
See application file for complete search history.

(56) References Cited

U.S. PATENT DOCUMENTS 5,280,527 A    1/1994   Gullman et al.
6,836,765 B1   12/2004  Sussman (Continued)

FOREIGN PATENT DOCUMENTS

GB    2333878 A    8/1999
JP    10-105614 A  4/1998

(Continued)

OTHER PUBLICATIONS

"Introducing the MasterCard SecureCode Host Service", 2003, MasterCard International, Retrieved online on May 18, 2009 from <http://www.ebronline.org/mastercard/PDF/SecureCodeHostedService.pdf>.

(Continued)

*Primary Examiner* — Matthew Mikels
(74) *Attorney, Agent, or Firm* — Kilpatrick Townsend & Stockton LLP

(57) ABSTRACT

The method for authenticating a mail order or telephone order transaction according to the present invention includes receiving authentication information from a cardholder, providing authentication information to an issuer, and determining whether the authentication information is valid. If the authentication information is valid, the issuer informs the merchant that the transaction is valid. In an embodiment, the issuer may not supply a personal assurance message and/or other confidential cardholder information previously supplied by the cardholder in response to the authentication information.

16 Claims, 4 Drawing Sheets

(51) Int. Cl.
*G06Q 20/24* (2012.01)
*G06Q 20/34* (2012.01)
*G06Q 20/40* (2012.01)
*G06Q 30/06* (2012.01)
*G07F 7/10* (2006.01)

(56) References Cited

U.S. PATENT DOCUMENTS

| | | |
|---|---|---|
| 6,931,382 B2 | 8/2005 | Laage et al. |
| 7,376,618 B1 | 5/2008 | Anderson et al. |
| 7,502,760 B1 | 3/2009 | Gupta |
| 8,453,925 B2 * | 6/2013 | Fisher et al. .................. 235/380 |
| 2001/0029485 A1 | 10/2001 | Brody et al. |
| 2002/0120587 A1 | 8/2002 | D'Agostino |
| 2002/0153424 A1 | 10/2002 | Li |
| 2003/0233327 A1 | 12/2003 | Keresman et al. |
| 2003/0233334 A1 * | 12/2003 | Smith ............................. 705/75 |
| 2004/0254867 A1 | 12/2004 | Nethery, III |
| 2005/0165667 A1 | 7/2005 | Cox |
| 2005/0289052 A1 | 12/2005 | Wankmueller |
| 2006/0006224 A1 | 1/2006 | Modi |
| 2007/0038924 A1 | 2/2007 | Beyer et al. |
| 2007/0203732 A1 | 8/2007 | Griegel et al. |

FOREIGN PATENT DOCUMENTS

| | | |
|---|---|---|
| JP | 2003-085148 A | 3/2003 |
| JP | 2003-511766 A | 3/2003 |
| JP | 2005-523505 A | 8/2005 |
| JP | 2006-527430 A | 11/2006 |
| WO | 2005/001635 A2 | 1/2005 |
| WO | 2005/072382 A2 | 8/2005 |
| WO | 2005/119608 A1 | 12/2005 |
| WO | 2007/103831 A2 | 9/2007 |

OTHER PUBLICATIONS

Verified by Visa, "Provide added online safety with Verified by Visa.", 2003, Visa U.S.A. Inc., Retrieved online on May 18, 2009 from <http://www.managedprepaid.com/library/pdf/clearauth/Visa_Merchant_DataSheet_V6.pdf>.

"New Payment Rules Change Online Retail 2003", 2002, CyberSource Corporation, Retrieved online on May 18, 2009 from <http://www.neowave.com.my/whitepapers/Cybersource.pdf>.

International Search Report for PCT/US07/63239, Jul. 11, 2007.

Singapore Examination Report corresponding to the Application No. 200806045-1, date of mailing Jul. 29, 2010, 10 pages total.

Written Opinion of the International Searching Authority corresponding to the PCT Application No. PCT/US07/63239, date of mailing Sep. 11, 2007, 4 pages total.

Fujita, "Card transaction over the Internet is finally safe, Visa started password authentication, Major sites hesitate for response", Nikkei Internet Solutions, No. 74, Japan, Nikkei Business Publications, Inc., Aug. 22, 2003, pp. 64-67.

Official Action for Japanese Patent Application No. 2008-557526 mailed Jun. 18, 2012, 12 pages.

Examination Report mailed Jan. 14, 2015 in Indian Patent Application No. 3282/KOLNP/2008, 3 pages.

* cited by examiner

METHODS AND SYSTEMS FOR PERFORMING AUTHENTICATION IN CONSUMER TRANSACTIONS

CROSS-REFERENCES TO RELATED APPLICATIONS

The present application is a continuation of non-provisional application U.S. Ser. No. 11/681,704, filed on Mar. 2, 2007, entitled "Method and System for Performing Two Factor Authentication in Mail Order and Telephone Order Transactions", which claims priority to U.S. Provisional Application Ser. No. 60/778,282, filed Mar. 2, 2006, entitled "Method and System for Performing Two Factor Authentication in Mail Order and Telephone Order Transactions", the entire contents of both of which are incorporated by reference herein in their entirety for all purposes.

BACKGROUND

During a transaction using a transaction card, such as a credit card, a debit card, a stored value card, a bank card, a loyalty card, a smart card and/or the like, it is important to verify a cardholder's ownership of an account to avoid a variety of problems, such as unauthorized use. Cardholder authentication is the process of verifying such ownership by the cardholder. For example, cardholder authentication during a "card present" transaction is performed when a merchant's representative verifies that the signature on a transaction card matches the cardholder's signature on a receipt.

Technological improvements have allowed businesses and individuals to engage in transactions in a plurality of environments. For example, cardholders can engage in traditional "in person" transactions, transactions via the Internet, transactions over the telephone and transactions through mail systems. In many cases, cardholders desire the convenience of performing transactions without having to directly visit a service provider. In doing so, the cardholder may seek to eliminate driving time and reduce the hassle associated with, for example, shopping in a retail environment or waiting in line at a bank by performing these transactions from the privacy of their own home.

"Card not present" ("CNP") transaction volumes are increasing at least in part because of such convenience provided to cardholders and the extra sales provided to merchants. However, as CNP transaction volumes increase, fraudulent transactions and the monetary losses due to such transactions are increasing as well.

Various solutions have been proposed to make ecommerce and/or online banking transactions more secure, such as two-factor authentication (e.g., by GPayment Pty. Ltd.), dynamic passcodes (e.g., by Barclay PLC) and token authentication (e.g., by MasterCard International Inc.). However, these technological solutions have not been implemented for mail order and telephone order ("MOTO") transactions due to unique challenges presented by such transactions.

For example, security weaknesses can arise when MOTO transactions use static passcodes. An unauthorized third party can obtain the static passcode by intercepting a transaction and reverse engineering the transmitted data to determine the account information and passcode. The unauthorized third party can be, for example, a person intercepting information passed between a cardholder and a merchant or between a merchant and an issuer. Alternatively, the unauthorized third party can be the merchant and/or its representative.

Solutions used to increase security include the use of static data, such as information stored in the Card Verification Value 2 ("CVV2") field of a transaction card, information from an address verification service, expiry dates, authorization controls and the like. The CVV2 field demonstrates that a cardholder is in possession of the transaction card. When the cardholder provides the CVV2 information to the merchant, the merchant includes the CVV2 in an authorization request to the issuer, and the authorization response advises the merchant whether the CVV2 information provided is valid.

One disadvantage of such static authentication measures is that the authentication value does not change for each transaction. Accordingly, a third party that has access to the card for even a short period of time may be able to copy the information and use it without the cardholder's knowledge.

Another disadvantage of static authentication measures is that such measures typically verify only the transaction card's presence as opposed to authenticating the cardholder. However, cardholder authentication provides stronger security than transaction card verification. For example, cardholder authentication provides card issuers with sufficient non-repudiation evidence to warrant providing merchant chargeback protection, while transaction card authentication does not.

Dynamic authentication technologies have also been devised to facilitate cardholder authentication in MOTO environments. Such technologies include voice authentication, sound authentication (i.e., transaction cards that generate dynamic sounds) and dynamic passcodes. One disadvantage of such dynamic authentication technologies is that they only represent one piece of the required solution needed to implement a MOTO authentication solution. Such technologies do not represent a solution to the infrastructure layer whereby merchants receive authentication data from cardholders and transmit such data to transaction card issuers. Merchants would need to implement systems to accept and forward the dynamic information. Moreover, acquirers would need to implement systems to pass dynamic information to the transaction card issuer.

Accordingly, cardholders and merchants are concerned that fraudulent MOTO transactions occur frequently and that information in non-fraudulent transactions can be stolen for fraudulent purposes. What is needed is a method and system for inhibiting unauthorized accesses to MOTO transactions.

A need exists for a method and system that permits a MOTO transaction to be performed securely.

A further need exists for a method and system of performing two-factor authentication in a MOTO environment to inhibit fraudulent access to MOTO transactions.

The present disclosure is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "cardholder" is a reference to one or more parties involved in an exchange of value, data and/or information. Unless expressly stated otherwise, all undefined technical and scientific terms used herein have the same meanings as commonly understood by one of ordinary skill in the art, while all defined technical and scientific terms shall be deemed to include the same meaning as commonly understood by one of ordinary skill in the art with the stated definition. Although any methods, materials and devices similar or equivalent to those described herein can be used, the preferred methods, materials and devices are now described. All publications mentioned herein are incorporated by reference. Nothing herein is to be construed as an admission that the invention is not entitled to antedate such disclosure by virtue of prior invention.

In an embodiment, a method for authenticating a mail order or telephone order transaction may include receiving authentication information by a merchant from a cardholder, providing authentication information to an issuer, and determining, by the issuer, whether the authentication information is valid. If the authentication information is valid, the issuer may inform the merchant that the transaction is valid. Otherwise, the issuer may inform the merchant that the authentication information is invalid. In an embodiment, the authentication information may include information such as a dynamic passcode, a static passcode, biometrics, or any other information that may be used to authenticate a transaction card, an account or a cardholder. For example, such information may include a sound, sound biometrics, a business identification, a country code, a card account number, a card expiration date, a cardholder name, issuer-specific authentication data specified in the "participating BIN" data (e.g., mother's maiden name), a billing address, a shipping address, a social security number, a telephone number, an account balance, a transaction history and/or a driver's license number. In an embodiment, the issuer may determine whether a merchant initiated the authentication as part of a MOTO transaction. In an embodiment, the issuer may not supply a personal assurance message and/or other cardholder information previously supplied by the cardholder in response to the authentication information if the merchant transmitted the information.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
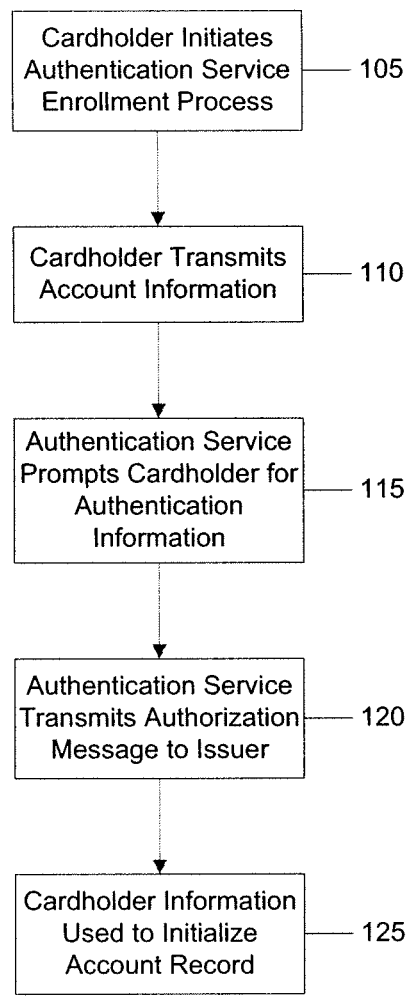
FIG. 1 illustrates an exemplary process for registering a cardholder with an authentication service according to an embodiment.

Exemplary methods for setting up, authorizing, registering and securely transacting in an online environment will now be described. Initially, an authentication service may be set up. Setting up the authentication service may involve performing initialization procedures for each participant in a system. These participants may include a plurality of entities, such as merchants, financial institutions (i.e., issuers), acquirers and cardholders. A merchant who signs up with the authentication service may receive a merchant plug-in software module for an online environment. In an embodiment, the plug-in software module may be designed specifically for the merchant's computing platform and commerce server software. Issuers participating in the authentication service may provide bank logos and marketing designs for incorporation into a customized authentication service enrollment site template. Acquirers may also provide the merchant with a service organization certification authority ("CA") root certificate, a service organization certification authority SSL certificate for client authentication and/or integration support.

Before an issuer uses the authentication service, the issuer may obtain a copy of authentication software programs specified in the issuer domain and may install hardware systems and the authentication service software. Issuers may also provide identity authentication policies and participating business identification number (BIN) information to the authentication service to be used in cardholder verification processes. In an embodiment, an issuer may provide authentication information to the authentication service. Pre-loading of authentication information may facilitate large volume support of cardholders. For example, when an issuer desires to activate all or most of its cardholders for the authentication service, the issuer may assign a Personal Identification Number ("PIN") to each of its cardholders. Each cardholder may then use the assigned PIN to access authentication information. In this manner, the enrollment process may be expedited because each cardholder may not be required to complete a formal enrollment process.

Authentication information may include information such as a dynamic passcode, a static passcode, biometrics, or any other information that may be used to authenticate a transaction card, an account or a cardholder. For example, such information may include a sound, sound biometrics, a business identification, a country code, a card account number, a card expiration date, a cardholder name, issuer-specific authentication data specified in the "participating BIN" data (e.g., mother's maiden name), a billing address, a shipping address, a social security number, a telephone number, an account balance, a transaction history and/or a driver's license number. Issuers may provide account number ranges for their card account portfolios and access control server ("ACS") IP addresses or Uniform Resource Locators ("URLs") to the directory server. In an embodiment, the authentication service may be offered through bank-branded Web sites, which allow cardholders to register with the authentication service. In an alternate embodiment, information may be transmitted via a mail service, over the telephone and/or via any other communication means.

FIG. 1 illustrates an exemplary process for registering a cardholder with an authentication service according to an embodiment. As shown in FIG. 1, a cardholder may visit 105 an enrollment Web site maintained by an issuer. In an alternate embodiment, a cardholder may contact an issuer by telephone, mail and/or other communication means. A cardholder may register with the authentication service by supplying one or more transaction card account numbers to the service. The cardholder may transmit 110 information, such as a primary account number ("PAN"), the cardholder's name, a card expiration date, an address, an e-mail address, a shopper identification value, an account verification value, a cardholder-specific password and/or authentication information.

After the cardholder sends the requested information to the authentication service, the service may verify that the cardholder's PAN falls within a card range registered by the issuer. The authentication service may further verify a cardholder's identity using, for example, an authentication database maintained by a third party and/or the issuer. In an embodiment, the issuer may verify a cardholder's identity using an issuer-provided file of approved cardholders. In an embodiment, the issuer may verify a cardholder's identity by analyzing status check authorizations. In an embodiment, the issuer may verify a cardholder's identity by comparing responses to pre-loaded information in the authentication database provided by the issuer.

If the specified PAN is not within the issuer-enrolled card range, the enrollment may be rejected, and the enrollment process may terminate. If the PAN is within an enrolled card range, an authorization for, for example, one dollar may be submitted through a service organization payment network, such as VisaNet, to the issuer. In an embodiment, the authorization of the one-dollar transaction may permit the issuer to verify the card account status, verify the address using the Address Verification Service, and verify the Card Verification Value 2 ("CVV2"). Alternate or additional information may be verified during the authorization process. In an embodiment, the CVV2 field may be a 3-digit value that is typically printed on the signature strip of the transaction card.

If the card is approved, the authentication service may prompt 115 the cardholder for additional authentication information to verify the cardholder's identity. The cardholder may provide a password and a "hint question and response" pair to authenticate the cardholder during subsequent purchase transactions.

When the cardholder's identity is verified and the appropriate responses are returned, the authentication service may send 120 an authorization message to the issuer. An enrollment server may then pass 125 cardholder information to an ACS to initialize records in an account holder file. The account holder file may store information such as: financial institution BIN numbers, account numbers, expiration dates, first and last names, driver's license numbers, billing addresses, social security numbers, cardholder passwords, cardholder password questions, cardholder password responses, cardholder email addresses, third party identity scores and other information.

Figure 2:
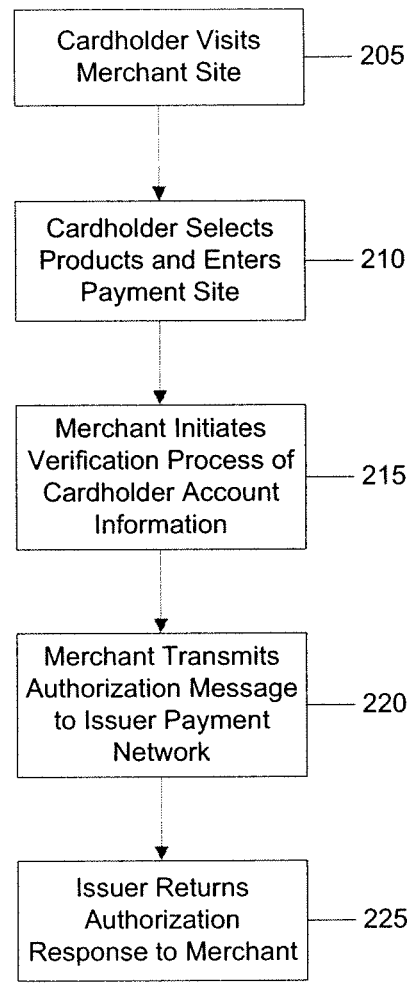
FIG. 2 depicts an exemplary process for an authenticated payment transaction according to an embodiment.

After the authentication service participants are initialized and a cardholder is registered, a payment transaction may be authenticated utilizing the authentication service. FIG. 2 depicts an exemplary process for authenticating an online payment transaction according to an embodiment. As shown in FIG. 2, a cardholder may visit 205 a merchant's ecommerce Web site. After the cardholder selects products or services for purchase, the cardholder may begin a checkout process, complete a checkout form and click on a "purchase" button 210.

After the "purchase" button is selected 210, the merchant plug-in software module may be activated. The merchant plug-in software may perform 215 a verification process to determine whether the cardholder-specified account is registered with the authentication service. Verification may be performed 215 using: i) a process in which a directory server and the ACS associated with the cardholder are checked, ii) a process in which only the ACS is checked, and/or iii) a process in which the merchant checks a cache memory containing information similar to the directory server.

The merchant plug-in software module may identify the PAN and query a directory server to verify that the PAN falls within a range of numbers associated with an issuer bank that is an authentication service participant. If the account number does not fall within a range of PANS defined on the directory server, the cardholder is not registered with the authentication service. In this case, the merchant may be notified that the account number is not registered, and the merchant plug-in software module may return control of the transaction to the merchant storefront software. At this point, the merchant storefront software may proceed with the transaction, refuse further service to the cardholder, or proceed with alternative payment methods.

If the PAN is within a range of PANs accepted by the directory server, the directory may send the PAN to the ACS capable of authenticating the cardholder to determine whether the card is enrolled. If the card is not enrolled, the verification process may be terminated. If the ACS indicates that the card is enrolled, the ACS, via the directory server, may return its URL to the merchant plug-in software module. The merchant plug-in software may invoke the ACS via the cardholder client device and its resident browser. A plurality of ACS's may be stored in the authentication service.

In an embodiment, the merchant plug-in software may query the ACS to verify the cardholder's registration with the authentication service. In an embodiment, the merchant may access a cache memory containing substantially the same information stored at the directory server to verify the cardholder's registration with the authentication service. In an embodiment, the authentication server may include only one logical directory server, although more than one physical directory server may reside in the authentication service.

If the cardholder is an authentication service participant, the ACS may display an issuer-branded window to the cardholder. The issuer-branded window may include basic payment transaction information and may prompt the cardholder for authentication information. The cardholder may enter the authentication information for verification by the ACS.

The payment authentication may continue if the correct authentication information is immediately entered or the correct response is provided to a hint question within an allowed number of attempts. The ACS may digitally sign a receipt using the issuer's signature key and/or a service provider's key. This receipt may include the merchant name, card account number, payment amount and the payment date. A receipt file may store the merchant name, merchant URL, card account number, expiration date, payment amount, payment date, issuer payment signature and/or cardholder authentication verification value. The ACS may then redirect the cardholder to the merchant plug-in software module through the cardholder's browser and may pass the digitally signed receipt and its determination as to whether the cardholder has been authenticated to the merchant. The merchant plug-in software module may use a validation server to verify the digital signature used to sign the payment receipt. After verifying the digital signature, the cardholder may be deemed "authenticated." After the transaction is completed, the cardholder may re-register a transaction card account and/or create new authentication information to be used for future transactions.

After the cardholder is authenticated, the specific cardholder's account may be authorized. Specifically, the merchant, through the merchant plug-in software module, may send 220 an authorization message to a payment network, such as VisaNet. The payment network may forward the authorization message and an electronic commerce indicator ("ECI") to an issuer. The issuer may receive the authorization message so that the issuer may verify to the merchant that a specific account is in good standing and has adequate credit available for the requested transaction. The ECI may indicate that the transaction was completed via the Internet so that an appropriate level of message security and authentication may be used.

After the issuer processes the authorization transaction, control of the purchase transaction may be returned to the merchant's storefront software via the payment network. The issuer may return 225 the authorization response via the payment network to the merchant. The authorization response may either authorize or decline the transaction.

For a MOTO transaction, a merchant may initiate authentication of the cardholder by redirecting the cardholder to the issuer for the exchange of authentication information. Since the cardholder does not have a direct connection to the issuer in a MOTO transaction, the cardholder may provide authentication information to the merchant. The merchant may then submit the information on behalf of the cardholder. Accordingly, for a MOTO transaction, the merchant may perform functions that a cardholder would typically perform in a "card present" or e-commerce transaction. In an embodiment, the authentication information may be dynamically generated to prevent the merchant from using the authentication information in a fraudulent manner and to otherwise prevent security from being compromised. The transaction system may determine whether a merchant is entering the information instead of the cardholder by requesting information from the merchant. Accordingly, when a MOTO transaction is being performed, sensitive cardholder information, such as a personal assurance message, may not be transmitted to the merchant. In an embodiment, an identifier may denote whether a MOTO transaction is performed.

Certain functions may not be appropriate to use when a merchant is acting on behalf of the cardholder in a MOTO transaction. For example, functionality that enables a cardholder to generate authentication information during a transaction to verify the cardholder for future transactions may be disabled when processing a MOTO transaction. Such a feature may be inappropriate when a merchant is performing data entry for a transaction. Likewise, if an issuer tracks the location of the transaction originator for risk mitigation purposes, such functionality may be disabled for a MOTO transaction in which the merchant enters the authentication information.

Figure 3:
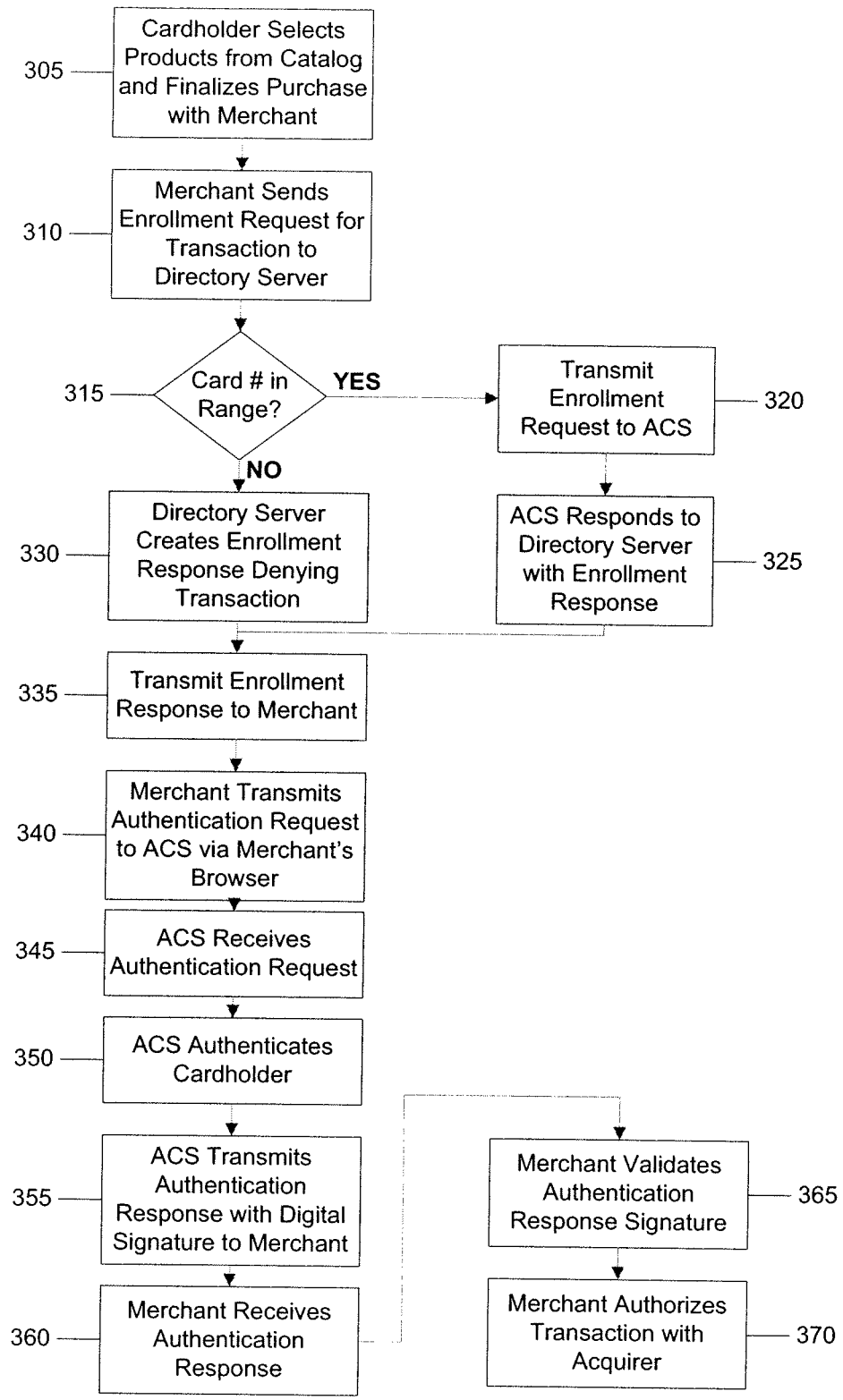
FIG. 3 depicts a flow diagram of an exemplary process for authenticating a MOTO transaction according to an embodiment.

FIG. 3 depicts a flow diagram of an exemplary process for authenticating a MOTO transaction according to an embodiment. As shown in FIG. 3, a cardholder may select items from a catalog and finalize 305 a purchase via, for example, a telephone or a mail service. The merchant may send 310 an enrollment request for the purchase to, for example, a directory server. A MOTO transaction indicator may be included with the enrollment request. The indicator may indicate that the transaction is a MOTO transaction and that the cardholder will not be directly providing authentication. If a card number offered by the cardholder to the merchant and transferred to the directory server is within a participating card range 315, the directory server may transmit 320 the enrollment request to, for example, an appropriate ACS. The ACS may respond 325 to the directory server with an enrollment response that indicates whether authentication is available for the card. If the card number is not in the participating range, the directory server may create 330 an enrollment response denying the transaction. The enrollment response may be sent 335 to the merchant.

Assuming that authentication is available, the merchant may transmit 340 an authentication request to the ACS via the merchant's browser. The ACS may receive 345 the authentication request and authenticate 350 the cardholder as appropriate for the card number. For example, the cardholder may be required to provide authentication information, a chip cryptogram, a PIN and/or the like. The ACS may determine that the transaction is a MOTO transaction by comparing the cardholder's account identifier with the enrollment request. The ACS may further determine which cardholder information fields are not confidential to the cardholder and are thus appropriate to display to the merchant. For example, a personal assurance message may not be appropriate for display to the merchant. The ACS may format and digitally sign an authentication response message before transmitting 355 the authentication response to the merchant via the merchant's browser. In an embodiment, the ACS may send the authentication response to an authentication history server for future verification. The merchant may receive 360 the authentication response and validate 365 the authentication response signature. If validated, the merchant may authorize 370 the transaction with its acquirer.

In an embodiment, the cardholder may be provided with a dynamic method of generating authentication information. The method by which authentication information is generated may vary and may not be explicitly constrained herein. For example, the cardholder may be provided with a printed sheet containing a list of one-time passcodes and/or limited duration passcodes. The cardholder may also be issued a dynamic passcode device, a transaction card and/or a reader that generates a dynamic passcode, and/or a transaction card that utilizes biometrics to generate a dynamic passcode.

Enhancements over previous methods of performing MOTO transactions may include the enablement of cardholder authentication without significant modifications to an underlying transaction system used in e-commerce and/or online banking environments. As such, the improved MOTO transaction described herein may enhance security without substantial modifications to the underlying infrastructure.

In an embodiment, a static passcode may be used. This may provide additional convenience for the cardholder. In an embodiment, static passcodes may be used in MOTO transactions for which the cardholder provides the passcode directly to the issuer instead of the merchant.

Figure 4:
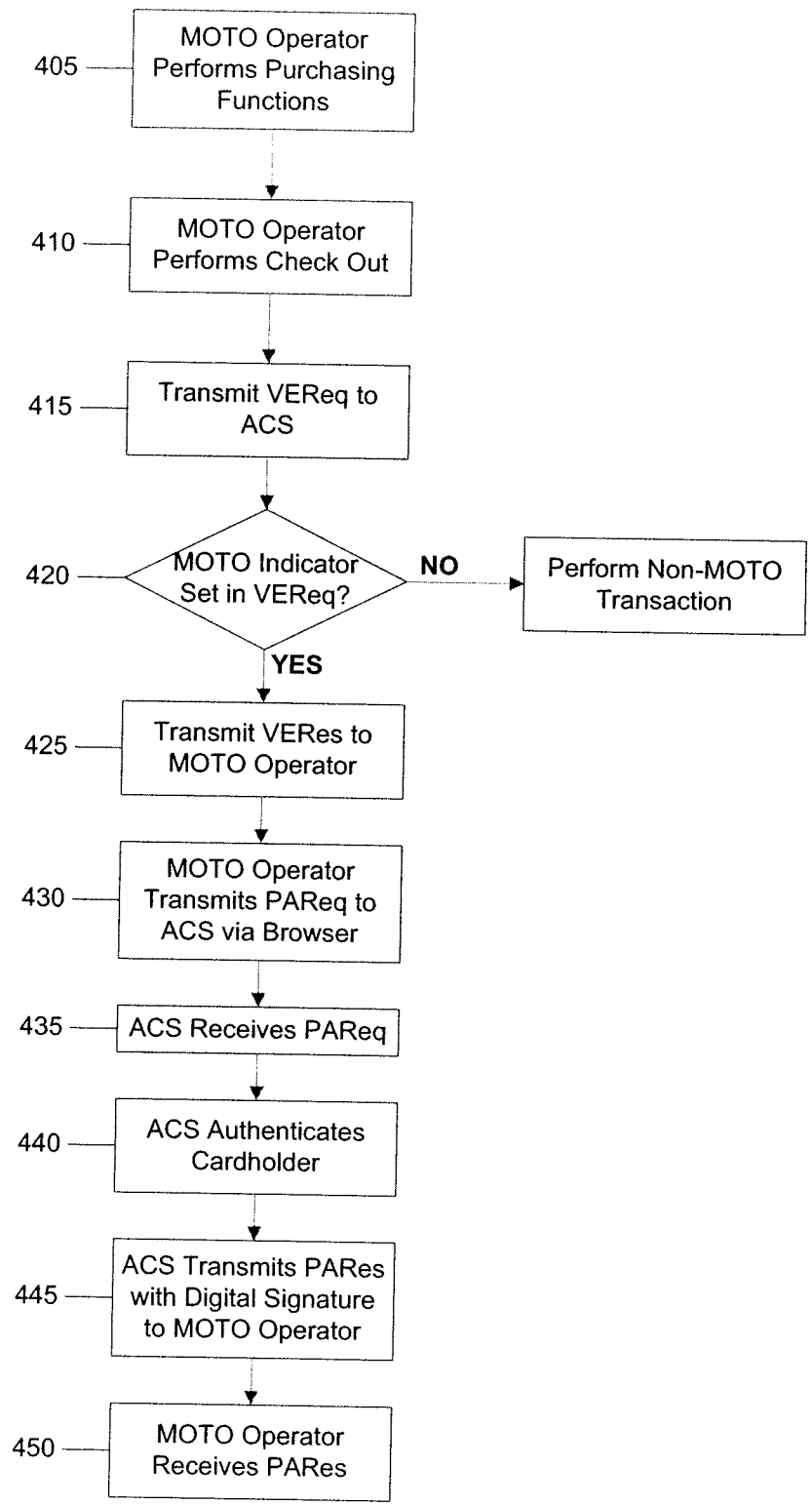
FIG. 4 depicts a flow diagram of an exemplary process for authenticating a MOTO transaction according to a preferred embodiment.

FIG. 4 depicts a flow diagram of an exemplary process for authenticating a MOTO transaction according to a preferred embodiment. As shown in FIG. 4, a MOTO operator, on behalf of a consumer, may perform 405 one or more functions using a merchant shopping cart on a merchant web site. In an embodiment, the one or more functions may include one or more of selecting merchandise; adding, removing and/or updating merchandise quantities; and maintaining a running total for selected merchandise. The MOTO operator may then perform 410 a check out process. For example, the MOTO operator, on behalf of the consumer, may enter shipping information, enter payment information, and/or finalize a transaction.

In an embodiment, a verification process may then be initiated. For example, merchant plug-in software may transmit 415 a Verify Enrollment Request ("VEReq") to an issuer ACS. In an embodiment, the VEReq may include a MOTO transaction indicator that is set for a MOTO transaction. The MOTO transaction indicator may indicate that the transaction is a MOTO transaction, and, thus, that the cardholder will not be directly providing authentication. The ACS may determine 420 whether the MOTO transaction indicator is set in the VEReq. If so, the ACS may respond 425 to the MOTO operator with a Verify Enrollment Response ("VERes") tailored to a MOTO transaction. In an embodiment, the VERes may include information indicating whether authentication is available for the transaction.

If authentication is available for the card, the MOTO operator may transmit 430 a Payer Authentication Request ("PAReq") to the ACS via the merchant's browser. The ACS may receive 435 the PAReq and may authenticate 440 the cardholder as appropriate based on the card number. In an embodiment, the ACS may recognize an account identifier as a MOTO transaction based on the VEReq/VERes process described above. The ACS may then generate 445 a Payer Authentication Response ("PARes") for transmission to the MOTO operator. In an embodiment, for a MOTO transaction, the ACS may not transmit sensitive cardholder information, such as a personal assurance message, a password and/or the like. In an embodiment, for a MOTO transaction, the ACS may disable an Activation During Shopping feature that tracks the location of a customer's purchases for fraud detection purposes. The MOTO operator may receive 450 the PARes and, optionally, display information pertaining to the transaction that authenticates the issuer. The MOTO operator may then engage in a transaction authorization process in which monetary value is transferred to the MOTO operator as usual.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art.

What is claimed is:

1. A method comprising:
   prior to receiving transaction type information indicative of a type of transaction engaged in between a consumer and a merchant, performing an enrollment process including:
     receiving consumer registration information including a financial account identifier;
     determining whether the financial account identifier is within a registered range;
     upon determining that the financial account identifier is not within the registered range, terminating the enrollment process; and
     upon determining that the financial account identifier is within the registered range, initializing a consumer record in an account holder file, wherein initializing the consumer record comprises:
       prompting the consumer for additional authentication information used to authenticate the consumer during subsequent purchase transactions, wherein the additional authentication information includes a password and a hint question and response pair,
       receiving the additional authentication information, and storing the additional authentication information in the account holder file;
   receiving, at an authentication system, transaction type information indicative of the type of transaction engaged in between the consumer and the merchant;
   determining, at the authentication system, the type of transaction engaged in between the consumer and the merchant based on the received transaction type information;
   communicating, from the authentication system, an authentication prompt based on the type of transaction engaged in between the consumer and the merchant;
   in response to communicating an authentication prompt, receiving, at the authentication system, authentication information for authenticating the consumer; and
   authenticating the consumer based on the received authentication information.

2. The method of claim 1, wherein the transaction type information indicates whether the transaction is a card-not-present transaction, and determining the type of transaction engaged in between the consumer and the merchant includes determining whether the type of transaction is a card-not-present transaction.

3. The method of claim 1, wherein communicating an authentication prompt based on the type of transaction engaged in between the consumer and the merchant includes:
   determining sensitive consumer information from enrollment information associated with the consumer and previously supplied by the consumer;
   generating an authentication prompt that excludes the sensitive consumer information; and
   communicating the authentication prompt that excludes the sensitive consumer information.

4. The method of claim 3, wherein the sensitive consumer information includes a personal assurance message.

5. The method of claim 1, further comprising:
   upon determining that the financial account identifier is within the registered range, verifying an identity of the consumer.

6. The method of claim 1, further comprising, prior to communicating an authentication prompt based on the type of transaction engaged in between the consumer and the merchant, performing an enrollment confirmation process including:
   receiving a financial account identifier associated with the consumer and the transaction type information indicative of a type of transaction engaged in between a consumer and a merchant;
   determining whether the financial account identifier is within a registered range;
   upon determining that the financial account identifier is not within the registered range, communicating, to the merchant system, information indicating that the consumer is not registered; and
   upon determining that the financial account identifier is within the registered range, determining whether the financial account identifier is enrolled.

7. The method of claim 1, wherein authenticating the consumer includes determining whether the received authentication information is correct, and the method further comprises:
   in response to determining that the received authentication information is correct:
     digitally signing a receipt for the transaction resulting in a signed receipt; and
     communicating the signed receipt to a merchant system associated with the merchant.

8. The method of claim 1, further comprising, after authenticating the consumer, authorizing a financial account associated with the consumer, wherein authorizing a financial account associated with the consumer includes communicating an authorization message including a financial amount associated with the transaction to a payment network.

9. A method comprising:
   communicating, from a merchant system associated with a merchant to an authentication system, transaction type information indicative of a type of transaction engaged in between a consumer and the merchant;
   receiving, at the merchant system, an authentication prompt based on the type of transaction engaged in between the consumer and the merchant;
   determining, at the merchant system, authentication information for authenticating the consumer; and
   communicating, from the merchant system to the authentication system and in response to the authentication prompt, the authentication information for the consumer, wherein receiving the authentication prompt based on the type of transaction engaged in between the consumer and the merchant includes:
- receiving an authentication prompt that excludes sensitive consumer information from enrollment information previously provided by the consumer to the authentication system; and
- communicating the authentication prompt that excludes sensitive consumer information to the merchant, wherein communicating the authentication prompt that excludes sensitive consumer information to the merchant includes displaying an issuer-branded window to the merchant that prompts for authentication information and excludes the sensitive consumer information.

10. The method of claim 9, wherein the authentication information for authenticating the consumer includes a dynamic passcode, a static passcode, biometrics, a sound, sound biometrics, a business identification, a country code, a card account number, a card expiration date, a consumer name, issuer-specific authentication data, a billing address, a shipping address, a social security number, a telephone number, an account balance, a transaction history, and/or a driver's license number.

11. The method of claim 9, further comprising performing an enrollment confirmation process including:
- determining a financial account identifier associated with the consumer;
- communicating an enrollment confirmation request including the financial account identifier to the authentication system;
- receiving a response indicative of whether the financial account identifier is enrolled; and
- communicating enrollment confirmation information to the merchant based on whether the financial account identifier is enrolled.

12. The method of claim 11, wherein the transaction type information indicative of a type of transaction engaged in between a consumer and the merchant is communicated to the authentication system with the enrollment confirmation request.

13. The method of claim 11, wherein the response indicative of whether the financial account identifier is enrolled is tailored based on the type of transaction engaged in between the consumer and the merchant.

14. The method of claim 9, further comprising:
- receiving, at the merchant system and in response to communicating the authentication information for the consumer, a digitally signed receipt;
- verifying the digitally signed receipt; and
- determining that the consumer is authenticated upon verifying the digitally signed receipt.

15. The method of claim 9, further comprising:
- prior to communicating transaction type information indicative of a type of transaction engaged in between a consumer and the merchant, determining items for purchase by the consumer as part of the transaction resulting in a total price for the items; and
- in response to determining that the consumer is authenticated, authorizing the total price with an acquirer or issuer.

16. The method of claim 9, further comprising:
- prior to communicating transaction type information indicative of a type of transaction engaged in between a consumer and the merchant, performing an enrollment confirmation process.

* * * * *

UNITED STATES PATENT AND TRADEMARK OFFICE
CERTIFICATE OF CORRECTION

| | | |
|---|---|---|
| PATENT NO. | : 9,135,621 B2 | Page 1 of 1 |
| APPLICATION NO. | : 13/887082 | |
| DATED | : September 15, 2015 | |
| INVENTOR(S) | : Douglas Fisher et al. | |

It is certified that error appears in the above-identified patent and that said Letters Patent is hereby corrected as shown below:

Claims

In Column 9, line 59, Claim 1 the text "communicating an" should read --communicating the--

In Column 10, line 4, Claim 3 the text "communicating an" should read --communicating the--

In Column 10, line 21, Claim 6 the text "communicating an" should read --communicating the--

In Column 10, lines 27-28, Claim 6 the text "of a type of transaction engaged in between a consumer and a merchant;" should read --of the type of transaction engaged in between the consumer and the merchant;--

In Column 10, line 49, Claim 8 the text "authorizing a" should read --authorizing the--

In Column 11, line 3, Claim 9 the text "receiving an" should read --receiving the--

In Column 11, lines 7-8, Claim 9 the text "excludes sensitive" should read --excludes the sensitive--

In Column 11, line 10, Claim 9 the text "excludes sensitive" should read --excludes the sensitive--

In Column 12, line 5, Claim 12 the text "indicative of a" should read --indicative of the--

In Column 12, line 22, Claim 15 the text "indicative of a type of transaction engaged in between a" should read --indicative of the type of transaction engaged in between the--

In Column 12, line 31, Claim 16 the text "indicative of a type of transaction engaged in between a" should read --indicative of the type of transaction engaged in between the--

Signed and Sealed this
Fifteenth Day of March, 2016

Michelle K. Lee
*Director of the United States Patent and Trademark Office*